(12) United States Patent
Davis

(10) Patent No.: US 8,254,438 B2
(45) Date of Patent: Aug. 28, 2012

(54) VIDEO QUALITY MEASUREMENT

(75) Inventor: Andrew G Davis, Woodbridge (GB)

(73) Assignee: British Telecommunications public limited company, London (GB)

( * ) Notice: Subject to any disclaimer, the term of this patent is extended or adjusted under 35 U.S.C. 154(b) by 1120 days.

(21) Appl. No.: 12/096,097

(22) PCT Filed: Nov. 7, 2006

(86) PCT No.: PCT/GB2006/004155
§ 371 (c)(1),
(2), (4) Date: Jun. 4, 2008

(87) PCT Pub. No.: WO2007/066066
PCT Pub. Date: Jun. 14, 2007

(65) Prior Publication Data
US 2008/0317111 A1 Dec. 25, 2008

(30) Foreign Application Priority Data
Dec. 5, 2005 (EP) .................................. 05257467

(51) Int. Cl.
*H04L 5/20* (2006.01)
(52) U.S. Cl. ....................................................... 375/240
(58) Field of Classification Search .................. None
See application file for complete search history.

(56) References Cited

U.S. PATENT DOCUMENTS
2005/0281333 A1* 12/2005 Ghanbari ................. 375/240.16

FOREIGN PATENT DOCUMENTS
| JP | 2006-507775 | 3/2006 |
| JP | 2006-509435 | 3/2006 |
| WO | 2004/049243 | 6/2004 |
| WO | 2004/054274 | 6/2004 |

OTHER PUBLICATIONS

International Search Report for PCT/GB2006/004155 mailed Jun. 5, 2007.
Winkler, "Digital Video Quality, Chapter 4. Models and Metrics", John Wiley & Sons, Jan. 25, XP002383462—section 4.1 Isotropic Contrast, 2005.
Wolf et al., "Spatial-temporal distortion metrics for in-service quality monitoring of any digital video system", *Proceedings of the SPIE*, vol. 3845, Sep. 1999, pp. 266-277, XP002188097.

(Continued)

*Primary Examiner* — Kevin C Harper
(74) *Attorney, Agent, or Firm* — Nixon & Vanderhye P.C.

(57) ABSTRACT

This application is concerned with a non-intrusive video quality measurement method, in particular where the video signal having: an original form; encoded form in which video signal has been encoded using a compression algorithm utilizing a variable quantiser step size such that the encoded signal includes a quantiser step size parameter; and, a decoded form in which the encoded video signal has been at least in part reconverted to the original form. The method comprises the steps of: a) generating a first quality measure which is a function of said quantiser step size parameter; b) generating a second quality measure which is a function of the spatial complexity of the frames represented by the video signal in the decoded form; and, c) combining the first and second measures in order to obtain an estimate for the subjective visual quality of the decoded video.

24 Claims, 5 Drawing Sheets

OTHER PUBLICATIONS

Lin et al,, "Visual Distortion Guage Based on Discrimination of Noticeable Contrast Changes", *IEEE Transactions on Circuits and Systems for Video Technology*, vol. 15, No. 7, Jul. 2005, pp. 900-909, XP001233010.

Miyahara et al., "Objective Picture Quality Scale (PQS) for Image Coding", *IEEE Transactions on Communications*, vol. 46, No. 9, Sep. 1998, XP011009248.

Osberger, W., Hammond, S., Bergmann, N., "An MPEG Encoder Incorporating Perceptually Based Quantisation," Space Centre for Satellite Navigation, Queensland Univ., Brisbane, Qld., 1997 IEEE TENCON, Region 10 Annual Conference, Speech and Image Technologies for Computing and Telecommunications, Proceedings of IEEE, Dec. 2-4, 1997, vol. 2, pp. 731-734, Brisbane, Qld. ISBN: 0-7803-4365-4.

Puri, A. Aravind, R., "Motion-Compensated Video Coding with Adaptive Perceptual Quantization," AT&T Bell Lab., Holmdel, NJ, IEEE Transactions on Circuits and Systems for Video Technology, Dec. 1991, vol. 1, No. 4, pp. 351-361, ISSN: 1051-8215.

Tao, B., Dickinson, B.W., Peterson, H.A., "Adaptive Model-Driven Bit Allocation for MPEG Video Coding," Dept. of Electr. Eng., Princeton Univ., NJ, IEEE Transactions on Circuits and Systems for Video Technology, Feb. 2000, vol. 10, No. 1, pp. 147-157, ISSN: 1051-8215.

Pinson, M.H., Wolf, S., "A New Standardized Method for Objectively Measuring Video Quality," Inst. for Telecommun. Sci., Boulder, CO, USA, IEEE Transactions on Broadcasting, Sep. 2004, vol. 50, No. 3, pp. 312-322, ISSN: 0018-9316.

Hekstra, A.P., et al., "PVQM—A perceptual quality video measure" Signal Processing: Image Communication 17 (2002) pp. 781-798.

Official Action in JP 2008-0543884, mailed Sep. 13, 2011, with English translation.

Tao, B., Dickinson, B.W., Peterson, H.A., "Adaptive Model-Driven Bit Allocation for MPEG Video Coding," Dept. of Electr. Eng., Princeton Univ., NJ, IEEE Transactions on Circuits and Systems for Video Technology, Feb. 2000, vol. 10, No. 1, pp. 147-157, ISSN: 1051-8215.

\* cited by examiner

VIDEO QUALITY MEASUREMENT

This application is the U.S. national phase of International Application No. PCT/GB2006/004155 filed 7 Nov. 2006 which designated the U.S. and claims priority to European Patent Application No. 05257467.0 filed 5 Dec. 2005, the entire contents of each of which are hereby incorporated by reference.

BACKGROUND AND SUMMARY

This invention is concerned with a video quality measure, in particular in situations where a video signal has been encoded using a compression algorithm.

When a video signal is to be transmitted from one location to another, it is known to encode or compress the signal using an encoding algorithm, such that the encoded signal can be transmitted using a lower bandwidth than would be needed without encoding. Upon reception, the encoded signal is decoded to retrieve the original signal. In many encoding techniques, a two dimensional cosines transform is performed, resulting in a series of transform coefficients, whose magnitude is quantized. So that the bandwidth can be allocated efficiently, the granularity of the quantisation, that is, the step size, is allowed to vary.

The process of encoding and decoding the video sequence can introduce distortion or otherwise reduce the quality of the signal. One way of measuring the level of distortion involves noting the opinion of viewers as to the level of perceptible distortion in a distorted video sequence, and averaging the results so as to obtain a Mean Opinion Score (MOS). However, this can be a time consuming process. As a result, it can be desirable to predict the loss of quality that a viewer will perceive in a video sequence. Although the degradation in the video quality as a result of encoding/decoding and the transmission process can be obtained by reference to the original sequence, such an approach is often inconvenient.

According to one aspect of the present invention, there is provided a method of generating a measure of quality for a video signal representative of a plurality of frames, the video signal having: an original form; an encoded form in which the video signal has been encoded using a compression algorithm utilising a variable quantiser step size such that the encoded signal has a quantiser step size parameter associable therewith; and, a decoded form in which the encoded video signal has been at least in part reconverted to the original form, the method comprising the steps of: a) generating a first quality measure which is a function of said quantiser step size parameter; b) generating a second quality measure which is a function of the spatial complexity of at least part of the frames represented by the video signal in the decoded form; and, c) combining the first and second measures.

Because the step size is derivable from the encoded video sequence, and because the complexity measure is obtained from the decoded signal, the need to refer to the original video signal is reduced. Furthermore, because in many encoding schemes the step size is transmitted as a parameter with the video sequence, use can conveniently be made of this parameter to predict video quality without having to calculate this parameter afresh. Importantly, it has been found that use of the complexity measure in combination with the step size improves the reliability of the quality measure more than would simply be expected from the reliability of the step size or the complexity alone as indicators of video quality.

According to another aspect of the present invention, there is provided a apparatus for generating a measure of quality for a video signal representative of a plurality of frames, the video signal having: an original form; an encoded form in which the video signal has been encoded using a compression algorithm utilising a variable quantiser step size such that the encoded signal has a quantiser step size parameter associable therewith; and, a decoded form in which the encoded video signal has been at least in part reconverted to the original form, the apparatus comprising: a) means for generating a first quality measure which is a function of said quantiser step size parameter; b) means for generating a second quality measure which is a function of the spatial complexity of the frames represented by the video signal in the decoded form; and c) means for combining the first and second measures so as to generate the measure of quality for the video signal.

BRIEF DESCRIPTION OF THE DRAWINGS

The invention will now be further described, by way of example only with reference to the following drawings in which.

OVERVIEW OF ONE EMBODIMENT

The embodiment below relates to a no-reference, decoder-based video quality assessment tool. An algorithm for the tool can operate inside a video decoder, using the quantiser step-size parameter (normally a variable included in the incoming encoded video stream) for each decoded macroblock and the pixel intensity values from each decoded picture to make an estimate of the subjective quality of the decoded video. A sliding-window average pixel intensity difference (pixel contrast measure) calculation is performed on the decoded pixels for each frame and the resulting average (TCF) is used as a measure of the noise masking properties of the video. The quality estimate is then made from a weighting function of the TCF parameter and an average of the step-size parameter. The weighting function is predetermined by multiple regression analysis on a training data base of characteristic decoded sequences and previously obtained subjective scores for the sequences. The use of the combination of, on the one hand the step-size and, on the other hand, a sliding-window average pixel intensity difference measure to estimate the complexity provides a good estimate of subjective quality.

In principle the measurement process used is applicable generally to video signals that have been encoded using compression techniques using transform coding and having a variable quantiser step size. The version to be described however is designed for use with signals encoded in accordance with the H.264 standard. (Although the version to be described is based on H.264 video codec, it also applies the other DCT based standard codecs, such as H.261, H.263, MPEG-2 (frame based) etc.)

The measurement method is of the non-intrusive or "no-reference" type—that is, it does not need to have access to a copy of the original signal. The method is designed for use within an appropriate decoder, as it requires access to both the parameters from the encoded bitstream and the decoded video pictures.

Figure 1:
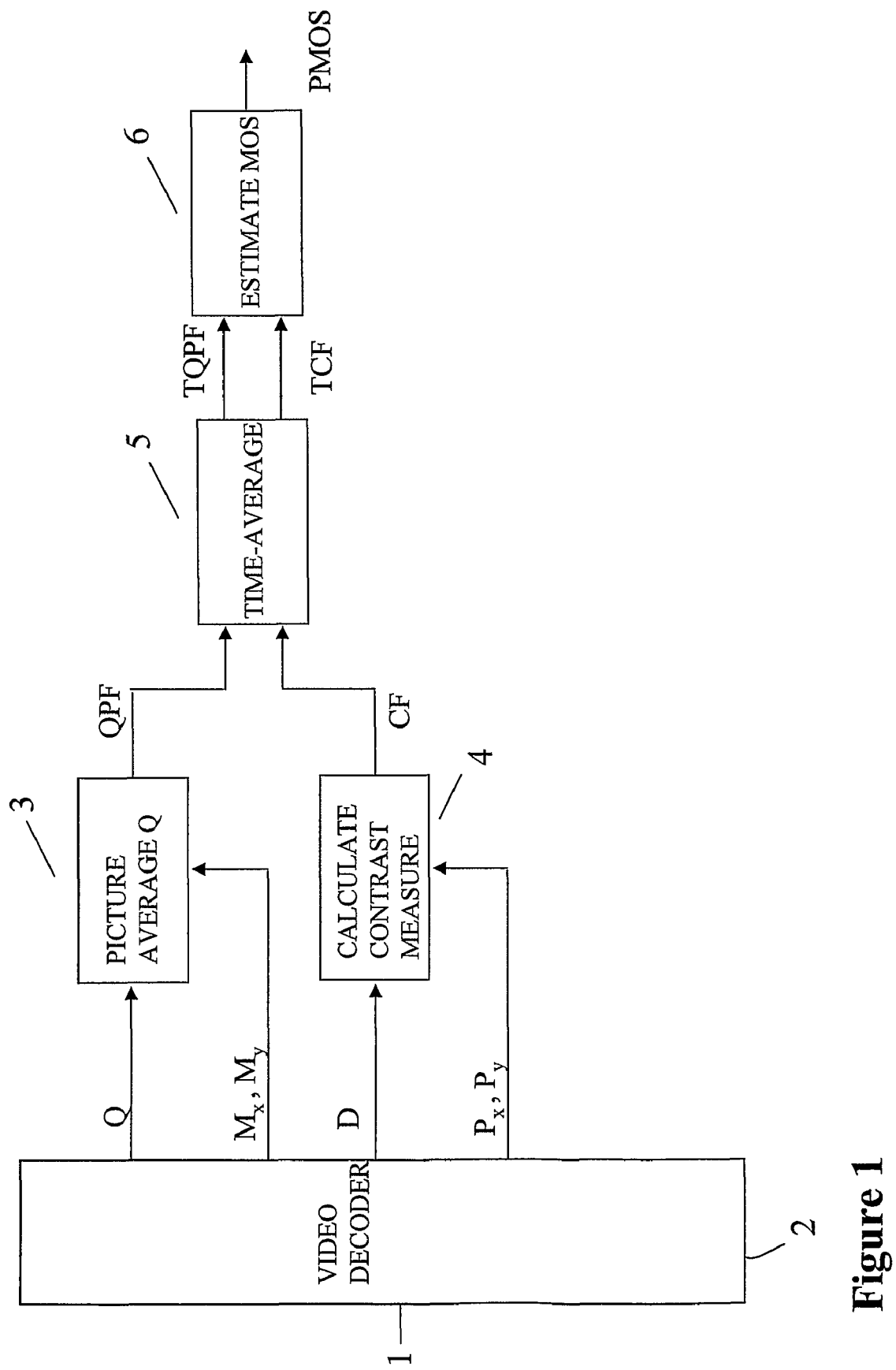
FIG. 1 is a block diagram showing in functional terms apparatus for estimating the quality of a video sequence

In the apparatus shown in FIG. 1, the incoming signal is received at an input 1 and passes to a video decoder which decodes and outputs the following parameters for each picture:
Decoded picture (D).
Horizontal decoded picture size in pixels ($P_x$)
Vertical decoded picture size in pixels ($P_y$)
Horizontal decoded picture in macroblocks ($M_x$)
Vertical decoded picture size in macroblocks ($M_y$)
Set of quantiser step-size parameters (Q).

There are two analysis paths in the apparatus, which serve to calculate the picture-averaged quantiser step-size signal QPF (unit 3) and the picture-averaged contrast measure CF (unit 4). Unit 5 then time averages signals QPF and CF to give signals TQPF and TCF respectively. Finally, these signals are combined in unit 6 to give an estimate PMOS of the subjective quality for the decoded video sequence D. The elements 3 to 6 could be implemented by individual hardware elements but a more convenient implementation is to perform all those stages using a suitably programmed processor.

Picture-Average Q

This uses the quantiser step size signal, Q, output from the decoder. Q contains one quantiser step-size parameter value, QP, for each macroblock of the current decoded picture. For H.264, the quantiser parameter QP defines the spacing, QSTEP, of the linear quantiser used for encoding the transform coefficients. In fact, QP indexes a table of predefined spacings, in which QSTEP doubles in size for every increment of 6 in QP. The picture-averaged quantiser parameter QPF is calculated in unit 3 according to $$QPF = (1/M_X * M_Y) \sum_{i=0}^{M_X-1} \sum_{j=0}^{M_Y-1} Q(i, j) \qquad (1)$$

where Mx and My are the number of horizontal and vertical macroblocks in the picture respectively and Q(i,j) is the quantiser step-size parameter for macroblock at position (i,j).

Calculate Contrast Measure

Figure 2:
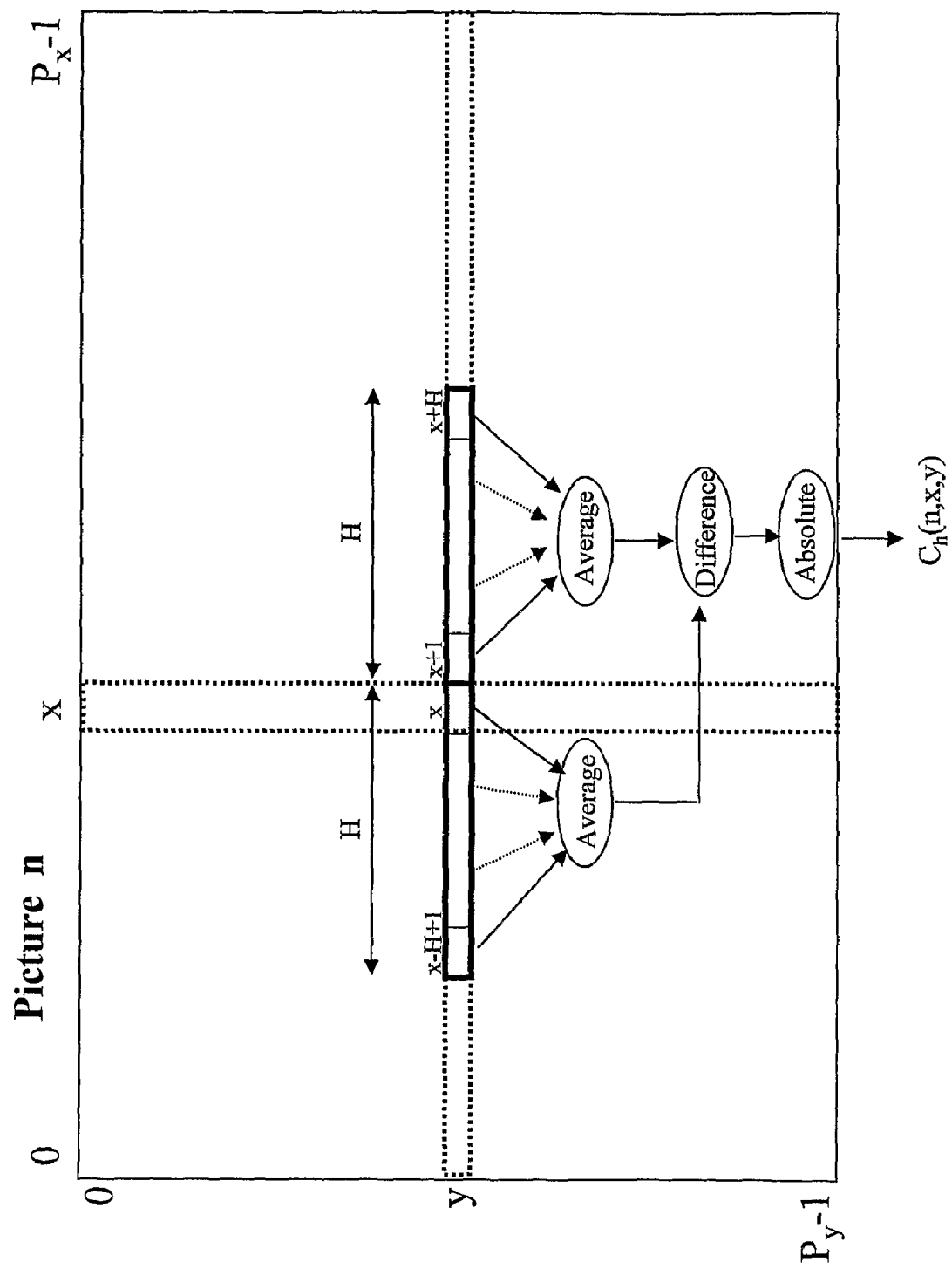
FIG. 2 illustrates how a horizontal contrast measure is calculated for a pixel in a picture

FIG. 2 and illustrate how the contrast measure is calculated for pixels p(x,y) at position (x,y) within a picture of size Px pixels in the horizontal direction and Py pixels in the vertical direction.

Figure 3:
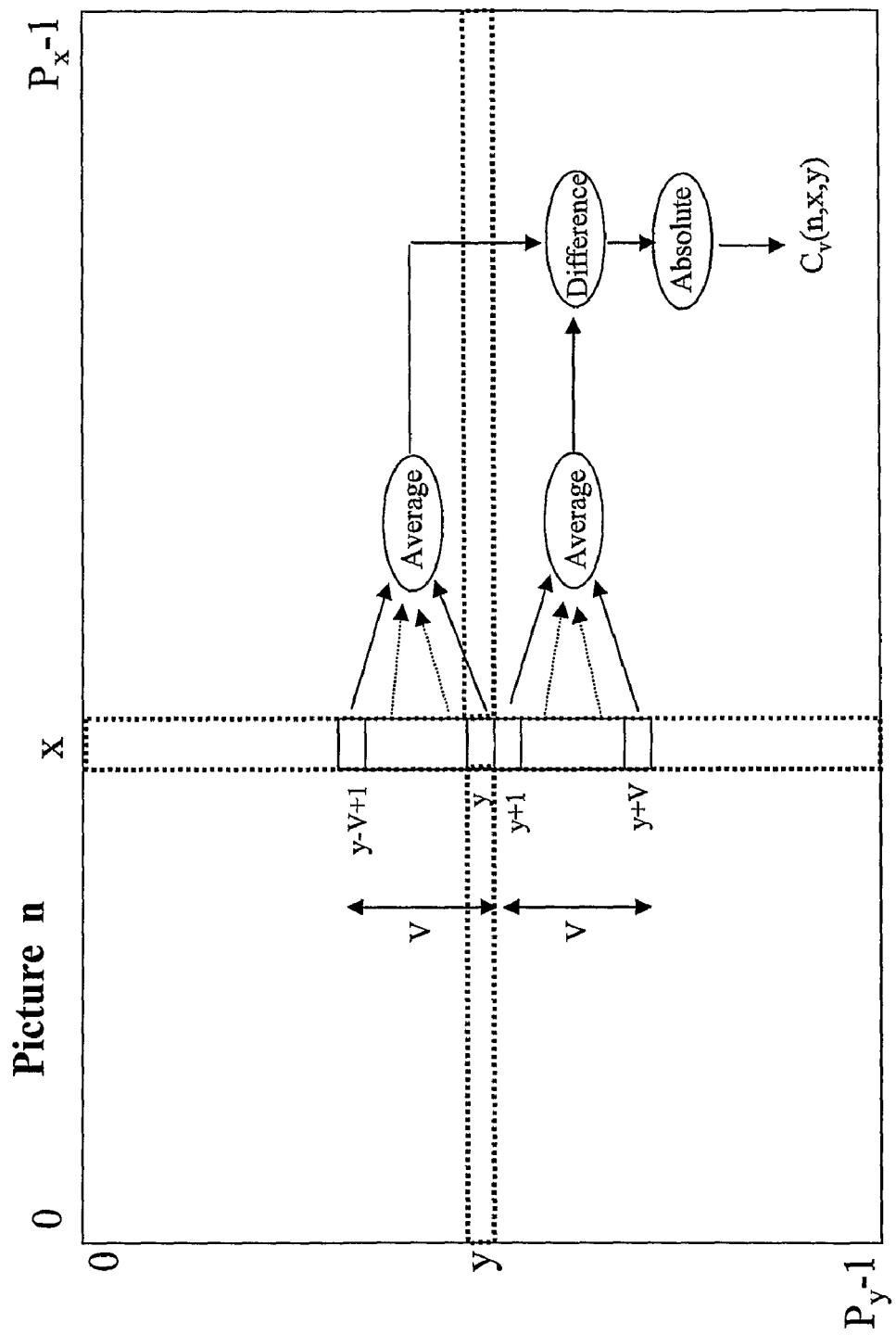
FIG. 3 illustrates how a vertical contrast measure is calculated for the pixel in the picture of FIG. 2.

The analysis to calculate the horizontal contrast measure is shown in FIG. 2. Here, the contrast measure is calculated in respect of pixel p(x,y), shown by the shaded region. Adjacent areas of equivalent size are selected (one of which includes the shaded pixel) Each area is formed from a set of (preferably consecutive) pixels from the row in which the shaded pixel is located. The pixel intensity in each area is averaged, and the absolute difference in the averages is then calculated according to equation (2) below, the contrast measure being the value of this difference. The vertical contrast measure is calculated in a similar fashion, as shown in FIG. 3. Here, an upper set of pixels and a lower set of pixels are select. Each of the selected pixels lie on the same column, the shaded pixel next to the border between the upper and lower sets. The intensity of the pixels in the upper and lower sets is averaged, and the difference in the average intensity of each set is then evaluated, the absolute value of this difference being the vertical contrast measure as set out in equation (3) below, that is, a measure of the contrast in the vertical direction. In the present example, the shaded pixels is included in the lower set. However, the position of the pixel with which the contrast measure is associated is arbitrary, provided that it is in the vicinity of the boundary shared by the pixels sets being compared.

Thus, to obtain the horizontal contrast measure, row portions of length H are compared, whereas to obtain the vertical contrast measure, column portions of length V are compared (the length H and V may but need not be the same). The contrast measure is associated with a pixel whose position that is local to the common boundary of, on the one hand, the row portions and on the other hand the column portions.

The so-calculated horizontal contrast measure and vertical contrast measure are then compared, and the greatest of the two values (termed the horizontal-vertical measure as set out in equation (4)) is associated with the shaded pixel, and stored in memory.

This procedure is repeated for each pixel in the picture (within a vertical distance V and a horizontal distance H from the vertical and horizontal edges of the picture respectively), thereby providing a sliding window analysis on the pixels, with a window size of H or V. The horizontal-vertical measure for each pixel in the picture (frame) is then averaged to give the overall pixel difference measure CF (see equation (5)). This overall measure associated with each picture is then averaged over a plurality of pictures to obtain a sequence-averaged measure, that is, a time averaged measure TCF according to equation (7). The number of pictures over which the overall (CF) measure is averaged will depend on the nature of the video sequence, and the time between scene changes, and may be as long as a few seconds. Clearly, only part of a picture need be analysed in this way, in particular if the quantisation step size varies across a picture.

By measuring the contrast at different locations in the picture and taking the average, a simple measure of the complexity of the picture is obtained. Because complexity in a picture can mask distortion, and thereby cause an observer to believe that a picture is of a better quality for a given distortion, the degree of complexity in a picture can be used in part to predict the subjective degree of quality a viewer will associate with a video signal.

The width (H) or height (V) of the respective areas about the shaded pixel is related to the level of detail at which an observer will notice complexity. Thus, if an image is to be viewed from afar, H and V will be chosen so as to be larger than in situations where it is envisaged that the viewer will be closer to the picture. Since in general, the distance from a picture at which the viewer will be comfortable depends on the size of the picture, the size of H and V will also depend on the pixel size and the pixel dimensions (larger displays typically have larger pixels rather than more pixels, although for a given pixel density, the display size could also be a factor). Typically, it is expected that H and V will each be between 0.5% and 2% of the respective picture dimensions. For example, the horizontal value could be 4*100/720=0.56%, where there are 720 pixels horizontally and each set for average contains 4 pixels, and in the vertical direction, 4*100/576=0.69% where there are 576 pixels in the vertical direction.

The analysis for calculating the contrast measure can be described with reference to the equations below as follows: the calculation uses the decoded video picture D and determines a picture-averaged complexity measure CF for each picture. CF is determined by first performing a sliding-window pixel analysis on the decoded video picture. In FIG. 2, which illustrates horizontal analysis for pixel p(x,y) within a picture of size $P_x$ horizontal and $P_y$ vertical pixels, the horizontal contrast measure $C_h$ is calculated for the n'th picture of decoded sequence D according to:

$$C_h(n, x, y) = \qquad (2)$$
$$(1/H)\left(\text{abs}\left(\left(\sum_{j=0}^{H-1} D(n, x-j, y)\right) - \left(\sum_{j=0}^{H-1} D(n, x+1+j, y)\right)\right)\right)$$
$$x = H-1 \ldots P_X - H - 1$$
$$y = 0 \ldots P_Y - 1$$

H is the window length for horizontal pixel analysis. $C_h(n, x, y)$ is the horizontal contrast parameter for pixel p(x,y) of the n'th picture of the decoded video sequence D. D(n,x,y) is the intensity of pixel p(x,y) of the n'th picture of the decoded video sequence D.

In FIG. 3, which illustrates the corresponding vertical pixel analysis, the vertical contrast measure CV is calculated by:

$$C_v(n, x, y) = \qquad (3)$$
$$(1/Y)\left(\text{abs}\left(\left(\sum_{j=0}^{V-1} D(n, x, y-j)\right) - \left(\sum_{j=0}^{V-1} D(n, x, y+1+j)\right)\right)\right)$$
$$x = 0 \ldots P_X - 1$$
$$y = V-1 \ldots P_Y - V - 1$$

Here, V is the window length for vertical pixel analysis. $C_h$ and $C_v$ may then be combined to give a horizontal-vertical measure $C_{hv}$, where $$C_{hv}(n,x,y) = \max(C_h(n,x,y), C_v(n,x,y))$$
$$x = H-1 \ldots P_x - H - 1$$
$$y = V-1 \ldots P_y - V - 1 \qquad (4)$$

It should be noted here that for some applications it may be better to leave horizontal and vertical components separate to allow different weighting parameters to be applied to each in the estimation of the subjective quality (unit 6).

Finally, an overall picture-averaged pixel difference measure, CF, calculated from the contrast values $C_h$, $C_v$ and/or $C_{hv}$ according to $$CF(n) = \left(\frac{1}{(P_X + 1 - 2H)}(P_Y + 1 - 2V)\right) \sum_{y=V-1}^{P_Y-V-1} \sum_{x=H-1}^{P_X-H-1} C(n, x, y) \qquad (5)$$

Time Average

This uses the picture-averaged parameters, QPF and CF, and determines corresponding time-averaged parameters TQPF and TCF according to:

$$TQPF = (1/N) \sum_{n=0}^{N-1} QPF(n) \qquad (6)$$

$$TCF = (1/N) \sum_{n=0}^{N-1} CF(n) \qquad (7)$$

The parameter averaging should be performed over the time-interval for which the MOS estimate is required. This may be a single analysis period yielding a single pair of TQPF and TCF parameters or maybe a sequence of intervals yielding a sequence of parameters. Continuous analysis could be achieved by "sliding" an analysis window in time through the CF and QPF time sequences, typically with a window interval in the order of a second in length.

Estimate MOS

This uses time-averaged parameters TQPF and TCF to make an estimate, PMOS, of the subjectively measured mean opinion score for the corresponding time interval of decoded sequence, D. TQPF contributes an estimate of the noise present in the decoded sequence and TCF contributes an estimate of how well that noise might be masked by the content of the video sequence. PMOS is calculated from a combination of the parameters according to:

$$PMOS = F_1(TPQF) + F_2(TCF) + K_0 \qquad (8)$$

$F_1$ and $F_2$ are suitable linear or non-linear functions in AvQp and CS.

$K_0$ is a constant.

PMOS is the predicted Mean Opinion Score and is in the range 1 ... 5, where 5 equates to excellent quality and 1 to bad. $F_1$, $F_2$ and $K_0$ may be determined by suitable regression analysis (e.g. linear, polynomial or logarithmic) as available in many commercial statistical software packages. Such analysis requires a set of training sequences of known subjective quality. The model, defined by F1, F2 and $K_0$, may then be derived through regression analysis with MOS as the dependent variable and TQPF and TCF as the independent variables. The resulting model would typically be used to predict the quality of test sequences that had been subjected to degradations (codec type and compression rate) similar to those used in training. However, the video content might be different.

For H.264 compression of full resolution broadcast material, a suitable linear model was found to be:

$$PMOS = -0.135 * TPQF + 0.04 * CS + 7.442 \qquad (9)$$

The resulting estimate would then be limited according to:

if (PMOS>5) PMOS=5 if (PMOS<1) PMOS=1 \qquad (10)

Below there is provided an additional discussion of various aspects of the above embodiment.

Introduction: full-reference video quality measurement tools, utilising both source and degraded video sequences in analysis, have been shown to be capable of highly accurate predictions of video quality for broadcast video. The design of no-reference techniques, with no access to the pre-impaired "reference" sequence, is a tougher proposition.

Another form of no-reference analysis may be achieved through access to the encoded bitstream, either within a decoder or elsewhere in the network. Such "bitstream" analysis has the advantage of having ready access to coding parameters, such as quantiser step-size, motion vectors and block statistics, which are unavailable to a frame buffer analysis. Bitstream analysis can range from computationally light analysis of decoded parameters, with no inverse transforms or motion predicted macroblock reconstruction, through to full decoding of the video sequence.

PSNR is a measure used in the estimate of subjective video quality in both video encoders and full-reference video quality measurement tools. In no-reference tools, PSNR can't be calculated directly, but may be estimated. Here we present a no-reference video quality prediction technique operating within an H.264/AVC decoder that can outperform the full-reference PSNR measure.

Firstly, results are presented to benchmark quality estimation using the PSNR measure for a variety of H.264 encoded sequences. Secondly, consideration is given to a bitstream technique, that uses a measure of average quantiser step-size (AvQP) to estimate subjective quality. Rather than just being an approximation to PSNR, it is shown that this bitstream, no-reference measure can outperform the full-reference PSNR measure for quality estimation. Finally, a measure of noise masking (CS) is introduced, that further enhances the performance of both PSNR and quantiser step-size based quality estimation techniques. The measure is based on a pixel difference analysis of the decoded image sequence and calculated within the video decoder. The resulting decoder based no-reference model is shown to achieve a correlation between measured and estimated subjective scores of over 0.91.

Video Test Material—Training and Testing Database: the video database used to train and test the technique consisted of eighteen different 8-second sequences, all of 625 broadcast format. The training set was made up of nine sequences, with six of the sequences from the VQEG1 database and the remaining three sourced from elsewhere. The test set consisted of nine different sequences. The VQEG1 content is well known and can be downloaded from the VQEG web site. As the quality parameters were to be based on averages over the duration of each sequence, it was important to select content with consistent properties of motion and detail. Details of the sequences are shown in Table 1.

TABLE 1

Training and test sequences.

| Training Sequence | Characteristics | Test Sequence | Characteristics |
|---|---|---|---|
| Barcelona | Saturated colour, slow zoom. | Boat | Water, slow movement. |
| Harp | Slow zoom, thin detail. | Bridge | Detail, slow movement. |
| Canoe | Water movement, pan, detail. | Ballroom | Patterns and movement. |
| Rugby | Movement, fast pan. | Crowd | Movement. |
| Calendar | High detail, slow pan. | Animals | Colour tones, movement. |
| Fries | Fast pan, film. | Fountain | Water movement. |
| Rocks | Movement, contrast variations. | Children | Movement. |
| Sport | Thin detail, movement. | Funfair | Localised high motion. |
| View | Slow movement, detail. | Street | Some movement. |

Video Test Material—Encoding: all of the training and test sequences were encoded using the H.264 encoder JM7.5c with the same encoder options set for each.

Key features of the encoder settings were: I, P, B, P, B, P, . . . frame pattern; Rate Control disabled; Quantisation parameter (QP) fixed; Adaptive frame/field coding enabled; Loop-filtering disabled With so many different possible encoder set-ups, it was decided to keep the above settings constant and to vary only the quantiser step-size parameters between tests for each source file.

Formal single-stimulus subjective tests were performed using 12 subjects for both training and testing sets. Averaged MOS results are shown in Table 2 (training set) and Table 3 (test set).

TABLE 2

Subjective scores for training sequences.

| | QP-P, QP-B | | | | | |
|---|---|---|---|---|---|---|
| Sequence | 20, 22 | 28, 30 | 32, 34 | 36, 38 | 40, 42 | 44, 46 |
| Barcelona | 4.86 | — | 4.43 | 3.29 | 2.43 | 2 |
| Harp | — | 5 | 4.43 | 3.57 | 2.14 | 1.43 |
| Canoe | 4.86 | 4.14 | 4.14 | 2.86 | 2 | — |
| Rugby | 4.86 | 4.71 | 4.71 | 2.86 | 1.86 | — |
| Calendar | 4.86 | 4.57 | — | 4 | 2.86 | 1.86 |
| Fries | 4.43 | 4.29 | 3.71 | 3.14 | 2.14 | — |
| Rocks | — | 5 | 4.43 | 4.29 | 3.71 | 2.57 |
| Sport | — | 4.43 | 4.57 | 3.57 | 2.14 | 1.29 |
| View | — | 4.29 | 3.57 | 3.14 | 3.14 | 1.71 |

TABLE 3

Subjective scores for test sequences.

| | QP-P,QP-B | | | | | |
|---|---|---|---|---|---|---|
| Sequence | 14, 16 | 24, 26 | 30, 32 | 34, 36 | 38, 40 | 42, 44 |
| Boat | 4.47 | 4.47 | 4.13 | 3.4 | 2.07 | 1.27 |
| Bridge | 4.6 | 4.07 | 3.73 | 3.67 | 2.8 | 1.8 |
| Ballroom | 4.33 | 4.27 | 4.4 | 4.1 | 3.1 | 1.93 |
| Crowd | 4.47 | 4.8 | 4.4 | 3.7 | 2.2 | 1.2 |
| Animals | 4.67 | 4.67 | 4.3 | 2.6 | 1.4 | 1.13 |
| Fountain | 4.6 | 4.13 | 3.8 | 2.6 | 1.7 | 1.07 |
| Children | 4.6 | 4.73 | 4.53 | 4.07 | 3.07 | 2.2 |
| Funfair | 5 | 5 | 4.6 | 3.87 | 3.07 | 1.67 |
| Street | 4.8 | 4.67 | 4.53 | 3.73 | 2.73 | 1.87 |

Figure 4:
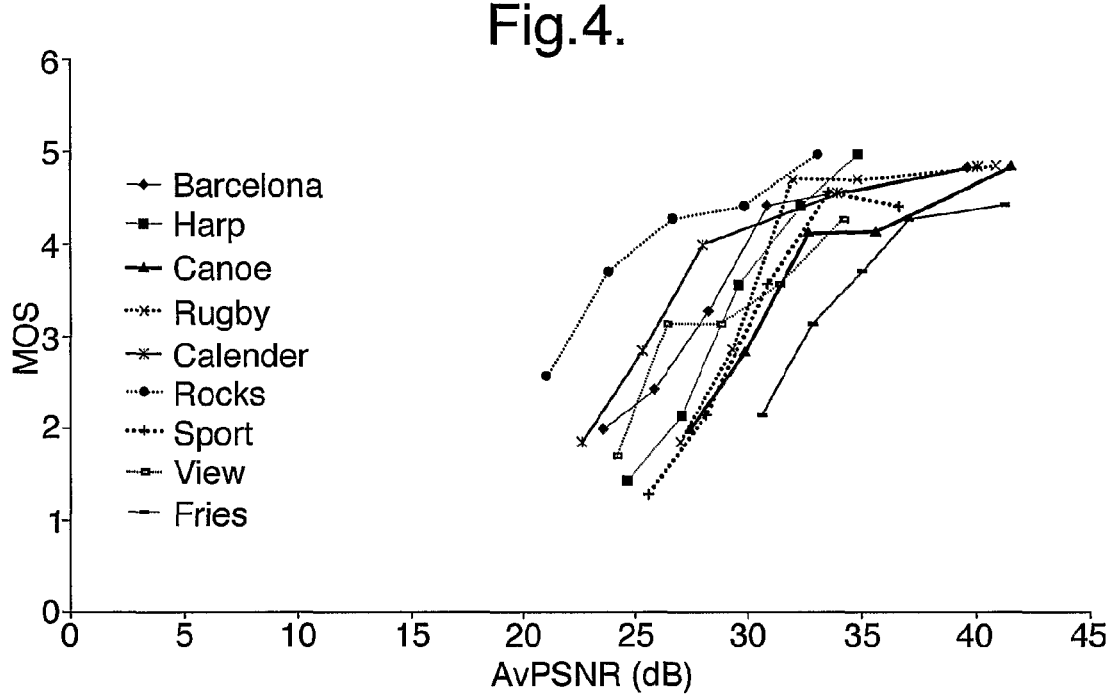
FIG. 4 shows AvPSNR vs. measured MOS for training sequences.

Quality Estimation—Peak Signal To Noise Ratio: peak signal to noise ratio (PSNR) is a commonly used full-reference measure of quality and is a key measure for optimizations in many video encoders. With correctly aligned reference and degraded sequences, PSNR is a straightforward measure to calculate and a time-averaged measure (AvPSNR) may be calculated according to $$AvPSNR = (1/N) \sum_{n=0}^{N-1} \left( \frac{10\log_{10}(255^2 * Y * X)}{\left( \sum_{y=0}^{Y-1} \sum_{x=0}^{X-1} (s(n,x,y) - d(n,x,y))^2 \right)} \right) \quad (11)$$

where s(n,x,y) and d(n,x,y) are corresponding pixel intensity values (0 . . . 255) within the n'th frame of N from source s and degraded d sequences of dimension of X horizontal (x=0 . . . X−1) and Y vertical (y=0 . . . Y−1) pixels. This equation was used to calculate the average PSNR over the 8 seconds of each of the 9 training sequences. A plot of average PSNR against average measured MOS is shown in FIG. 4.

The content-dependent nature of the data is demonstrated when MOS scores at an average PSNR of 25 dB are considered. A 3 MOS-point range in the data shows the potential inaccuracy of using PSNR to estimate perceived quality. Polynomial regression analysis yields a correlation of 0.78 and RMS residual of 0.715 between the MOS and AvPSNR data.

Quality Estimation—Quantiser Step-size: for H.264, the quantiser parameter QP defines the spacing, QSTEP, of the linear quantiser used for encoding the transform coefficients. QP indexes a table of predefined spacings, in which QSTEP doubles in size for every increment of 6 in QP.

Figure 5:
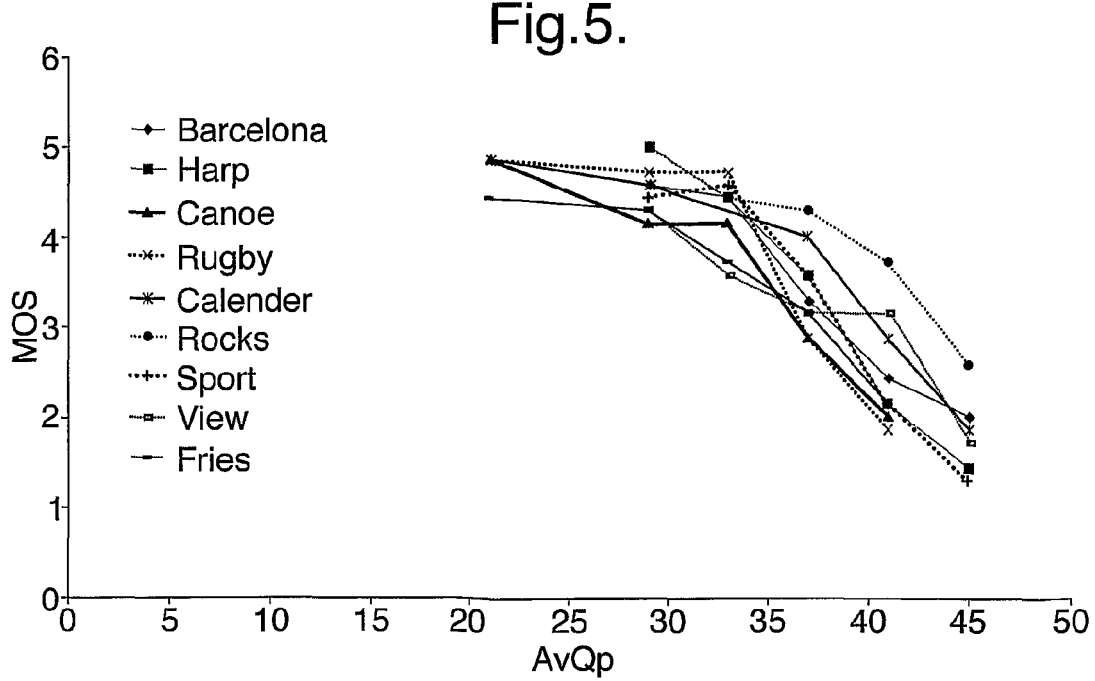
FIG. 5, shows AvQP vs. measured MOS for training sequences.

For each test on the training set, QP was fixed at one value of 20, 28, 32, 36, 40 or 44 for P and I macroblocks and 2 greater for B macroblocks. FIG. 5 shows a plot of average QP against average MOS for each of the 9 training sequences.

Polynomial regression analysis between MOS and average QP yields a correlation of 0.924 and RMS residual of 0.424. It is also evident that the expected MOS range at a variety of QP values is significantly less than that for AvPSNR.

One estimate of PSNR from quantiser step size relies on the approximation of a uniform distribution of error values within the quantisation range. However, this approximation does not hold for low bit-rates with large step-sizes, when the majority of coefficients are "centre-clipped" to zero. Somewhat surprisingly, the results show that AvQP may be a better predictor of subjective score than PSNR. It should be noted here, that the possibility that non-linear mapping between QP and actual quantiser step-size in H.264 might somehow ease the polynomial analysis has been discounted, with similar results achieved for actual step-size vs. MOS.

Pixel Contrast Measure—Distortion Masking: distortion masking is an important factor affecting the perception of distortion within coded video sequences. Such masking occurs because of the inability of the human perceptual mechanism to distinguish between signal and noise components within the same spectral, temporal or spatial locality. Such considerations are of great significance in the design of video encoders, where the efficient allocation of bits is essential. Research in this field has been performed in both the transform and pixel domains. Here, only the pixel domain is considered.

Pixel Contrast Measure—Pixel Difference Contrast Measure: here, the idea of determining the masking properties of image sequences by analysis in the pixel domain is applied to video quality estimation. Experiments revealed a contrast measure calculated by sliding window pixel difference analysis to perform particularly well.

Pixel difference contrast measures $C_h$ and $C_v$ are calculated according to equations (2) and (3) above, where H is the window length for horizontal pixel analysis and V is the window length for vertical pixel analysis. $C_h$ and $C_v$ may then be combined to give a horizontal-vertical measure $C_{hv}$, according to equation (4). $C_{hv}$ may then used to calculate an overall pixel difference measure, CF, for a frame according to equation (5), and in turn a sequence-averaged measure CS, as defined in equation (6) above. The sequence-averaged measure CS (referred to as TCF above) was calculated for each of the decoded training sequences using H=4 and V=2 and the results, plotted against average quantiser step size, are shown in FIG. 6.

Figure 6:
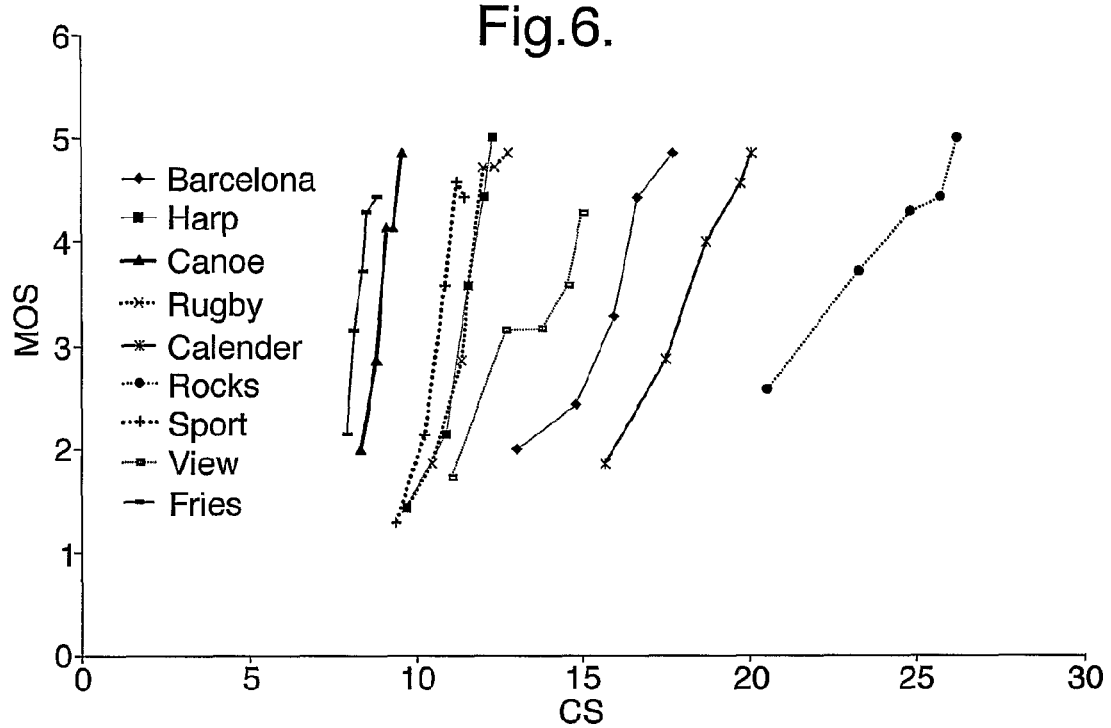
FIG. 6 shows CS vs. measured MOS for training sequences.

The results in FIG. 6 show a marked similarity in ranking to the PSNR vs. MOS results of FIG. 4 and, to a lesser degree, the AvQstep vs. MOS results of FIG. 5. The "calendar" and "rocks" sequences have the highest CS values and, over a good range of both PSNR and AvQstep, have the highest MOS values. Similarly, the "canoe" and "fries" sequences have the lowest CS values and amongst the lowest MOS values. Therefore, the CS measure calculated from the decoded pixels appears to be related to the noise masking properties of the sequences. High CS means high masking and therefore higher MOS for a given PSNR. The potential use of the CS measure in no-reference quality estimation was tested by its inclusion in the multiple regression analysis described below.

Results: firstly, average MOS (dependent variable) for the training set was modelled by PSNR (independent variable) using standard polynomial/logarithmic regression analysis as available in many commercial statistical software packages [14]. The resulting model was then used on the test sequences. This was then repeated using AvQP as the independent variable. The process was repeated with CS as an additional independent variable in each case and the resulting correlation between estimated and measured MOS values and RMS residuals are shown in table 4.

TABLE 4

Correlation and RMS residual of estimated MOS with measured MOS.

| Sequence set | Correlation (RMS residual) | | | |
|---|---|---|---|---|
| | PSNR | PSNR, CS | AvQP | AvQP, CS |
| Training sequences | 0.77 | 0.91 | 0.92 | 0.95 |
| | (0.71) | (0.47) | (0.44) | (0.33) |
| Test sequences | 0.818 | 0.879 | 0.875 | 0.916 |
| | (0.847) | (0.688) | (0.576) | (0.486) |

Results show that including the sequence averaged contrast measure (CS) in a PSNR or AvQP-based MOS estimation model increases performance for both training and test data sets. The performance of the model using AvQP and CS parameters was particularly good, achieving a correlation of over 0.9 for both training (0.95) and more impressively testing (0.916).

Figure 7:
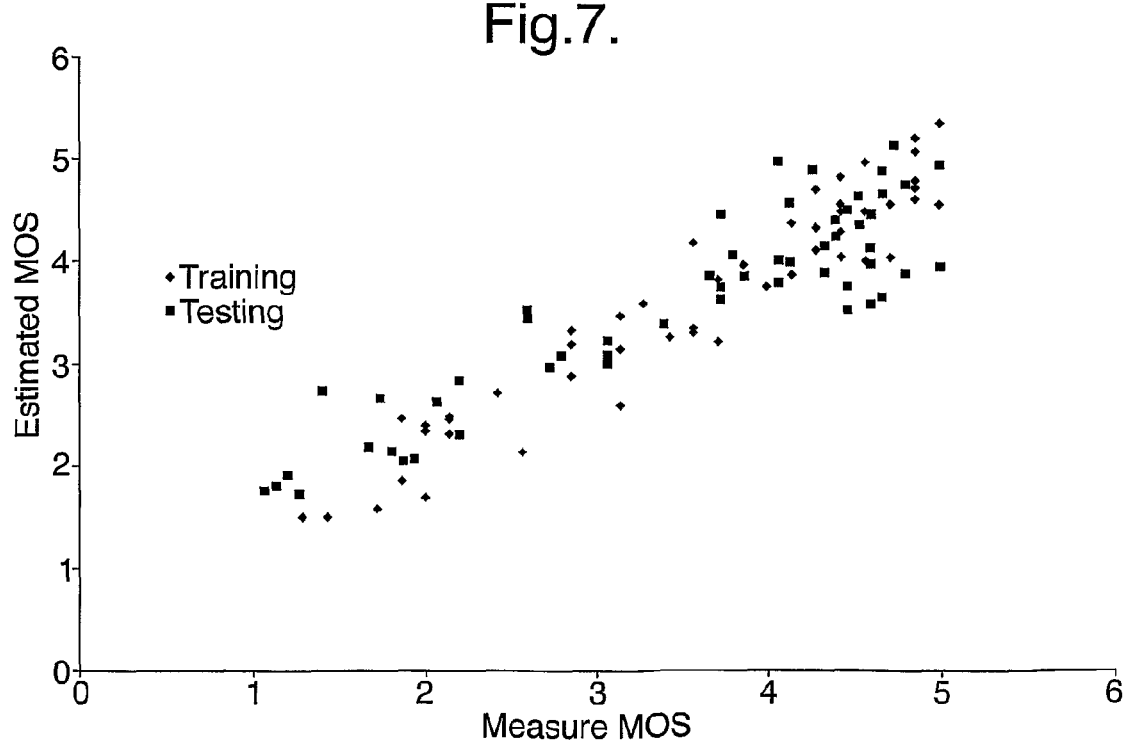
FIG. 7 shows measured vs. estimated MOS for AvQP/CS model

The individual training and test results for the AvQP/CS model are shown in the form of a scatter plot in FIG. 7.

Conclusions: a two parameter model for the estimation of subjective video quality in H.264 video decoders has been presented. The AvQP parameter, which corresponds to the H.264 quantiser step-size index averaged over a video sequence, contributes an estimate of noise. The CS parameter, calculated using sliding-window difference analysis of the decoded pixels, adds an indication of the noise masking properties of the video content. It is shown that, when these parameters are used together, surprisingly accurate subjective quality estimation may be achieved in the decoder.

The 8-second training and test sequences were selected with a view to reducing marked variations in the image properties over time. The aim was to use decoded sequences with a consistent nature of degradation so that measured MOS scores were not unduly weighted by short-lived and distinct distortions. In this way, modelling of MOS scores with sequence-averaged parameters becomes a more sensible and accurate process.

The contrast measure CF defined in equation (5) depends on an average being performed over each pixel for the whole cropped image. It was recognised that analysing CF over spatio-temporal blocks, might be beneficial.

What is claimed is:

1. A method of generating a measure of quality for a video signal representative of a plurality of frames, the video signal having: an original form; an encoded form in which the video signal has been encoded using a compression algorithm utilising a variable quantiser step size such that the encoded signal has a quantiser step size parameter associable therewith; and, a decoded form in which the encoded video signal has been at least in part reconverted to the original form, the method comprising:
   a) generating a first quality measure which is a function of said quantiser step size parameter;
   b) from the video signal in the decoded form, generating a second quality measure as a function of the spatial complexity of at least part of a given frame for at least some of the pixels in that frame, determined from a measure of changes in intensity in a first direction at a given pixel, and changes in intensity at that pixel in a second direction; and
   c) combining the first and second measures.

2. A method as claimed in claim 1, wherein the spatial complexity is measured by determining a local contrast measure at a plurality of positions in a frame.

3. A method as claimed in claim 2, wherein each local contrast measure is obtained by performing a comparison function on the intensity of neighbouring regions of a frame.

4. A method as claimed in claim 3, wherein each frame includes plurality of pixels, and wherein for at least some of the pixels of a given frame, the comparison function is performed on neighbouring regions in the vicinity of a pixel, so as to obtain a comparison value in respect of that pixel.

5. A method as claimed in claim 1, wherein the neighbouring regions are elongate.

6. A method as claimed in claim 5, wherein the frames each include a plurality of pixels arranged in a grid fashion, the grid having a plurality of rows and a plurality of columns, and wherein each elongate region is formed by a plurality of pixels arranged along a row portion or a column portion.

7. A method as claimed in claim 1, wherein pairs of neighbouring regions elongate in a first direction are compared.

8. A method as claimed in claim 7, wherein pairs of neighbouring regions elongate in a second direction are compared.

9. A method as claimed in claim 8, wherein the first direction and the second direction are orthogonal to one another.

10. A method as claimed in claim 3, wherein the comparison function involves evaluating the difference in the intensity of a pair of neighbouring regions.

11. A method as claimed in claim 3, wherein for neighbouring regions in the vicinity of a pixel, the comparison function involves evaluating the difference in the intensity of a first pair of neighbouring regions elongate in a first direction, and, evaluating the difference in the intensities of a pair of neighbouring regions elongate in a second direction.

12. A method as claimed in claim 11, wherein the comparison function further involves choosing the greater of the differences in the first and second directions.

13. A method as claimed in claim 1, wherein the first and second directions are orthogonal to one another.

14. A method as claimed in claim 13, wherein for a given pixel, the spatial complexity is calculated using the greater of the gradients in the first and second directions at that pixel.

15. A method as claimed in claim 13, wherein the measure of the intensity gradient is linearly related to the difference in the intensity of neighbouring regions of a frame.

16. A method as claimed in claim 15, wherein the intensity of each neighbouring region is obtained from the average intensity of the pixels within that region.

17. A method as claimed in claim 2, wherein the spatial complexity of a frame is calculated using an average of the local contrast measure obtained at different positions in a frame.

18. A method as claimed in claim 2, wherein the spatial complexity of a plurality of frames is averaged.

19. A method as claimed in claim 1, wherein the spatial complexity is obtained by performing a comparison function on neighbouring regions in frame, which neighbouring regions are elongate so as to each have a long axis and a short axis, and wherein the long axis of each elongate region is between 0.5% and 2% of the frame dimension in the direction of the long axis.

20. A method as claimed in claim 19, wherein the short axis of each elongate region corresponds to the width of a single pixel.

21. An apparatus for generating a measure of quality for a video signal representative of a plurality of frames, the video signal having: an original form; an encoded form in which the video signal has been encoded using a compression algorithm utilising a variable quantiser step size such that the encoded signal has a quantiser step size parameter associable therewith; and, a decoded form in which the encoded video signal has been at least in part reconverted to the original form, the apparatus comprising:
   a) means for generating a first quality measure which is a function of said quantiser step size parameter;
   b) means for generating, from the video signal in the decoded form, a second quality measure as a function of the spatial complexity of a given frame for at least some of the pixels in that frame, determined from a measure of changes in intensity in a first direction at a given pixel, and changes in intensity at that pixel in a second direction; and
   c) means for combining the first and second measures so as to generate the measure of quality for the video signal.

22. The apparatus as in claim 1, wherein the first and second directions are orthogonal to one another.

23. A method of generating a measure of quality for a video signal representative of a plurality of frames, the video signal having: an original form; an encoded form in which the video signal has been encoded using a compression algorithm utilising a variable quantiser step size such that the encoded signal has a quantiser step size parameter associable therewith; and, a decoded form in which the encoded video signal has been at least in part reconverted to the original form, the method comprising:
   a) generating a first quality measure which is a function of said quantiser step size parameter;
   b) generating a second quality measure which is a function of the spatial complexity of at least part of the frames represented by the video signal in the decoded form; and
   c) combining the first and second measures;
   wherein the spatial complexity is measured by determining a local contrast measure at a plurality of positions in a frame;
   wherein each local contrast measure is obtained by performing a comparison function on the intensity of neighboring regions of a frame; and
   wherein for neighboring regions in the vicinity of a pixel, the comparison function involves evaluating the difference in the intensity of a first pair of neighboring regions elongate in a first direction, and, evaluating the difference in the intensities of a pair of neighboring regions elongate in a second direction.

24. A method of generating a measure of quality for a video signal representative of a plurality of frames, the video signal having: an original form; an encoded form in which the video signal has been encoded using a compression algorithm utilising a variable quantiser step size such that the encoded signal has a quantiser step size parameter associable therewith; and, a decoded form in which the encoded video signal has been at least in part reconverted to the original form, the method comprising:
   a) generating a first quality measure which is a function of said quantiser step size parameter;
   b) generating a second quality measure which is a function of the spatial complexity of at least part of the frames represented by the video signal in the decoded form; and
   c) combining the first and second measures;
   wherein the spatial complexity is obtained by performing a comparison function on neighboring regions in frame, which neighboring regions are elongate so as to each have a long axis and a short axis, and wherein the long axis of each elongate region is between 0.5% and 2% of the frame dimension in the direction of the long axis.

* * * * *